Patented May 13, 1941

2,241,518

UNITED STATES PATENT OFFICE 2,241,518

TUBING

John W. Offutt, Ellwood City, Pa., assignor to National Tube Company, a corporation of New Jersey No Drawing. Application March 6, 1939, Serial No. 260,148

6 Claims. (Cl. 205—8)

This invention relates to metallic tubing and more particularly to the manufacture thereof in small diameters, such as are used for hypodermic needles, instrument pressure lines, fuel injector tubing for Diesel engines, heat exchanger tubing for refrigerators, etc.

Small diameter seamless tubing is usually produced by successive cold-drawing operations, each of which effects a diameter reduction and some of which may also effect wall reductions. In the earlier stages of the process when the hot-rolled tubular blank is being cold-drawn to smaller diameters and thinner walls, the inside diameter is large enough to permit the use of a stationary mandrel, which supports the inside diameter of the tube as it is drawn through the die, that reduces the diameter and wall thickness. When the inside diameter becomes so small that it is not practical to use a stationary mandrel, a hardened steel bar, rod or wire is inserted in the tube prior to its passage through the die, which controls the inside diameter similarly to the stationary mandrel described above.

This bar must be removed from within the tube after each passage through the die, as once the tube is reduced in diameter so that the tube is tight on the bar no further reduction or elongation can be made without reducing or elongating the bar itself; since in elongating the tube must travel in relation to the bar, which is impossible when the tube is once tightly drawn down on the bar. The bar is removed from within the tube after each cold-drawing operation in order to anneal the tubular work-piece. This series of operations is very tedious and expensive.

It is among the objects of the present invention to effect the cold-reduction of small diameter metallic tubing without the mandrel difficulties heretofore encountered by providing a novel material for disposition within said tubing.

According to the method of the present invention, when the inside diameter of the workpiece becomes so small that the use of a stationary mandrel becomes impractical and uneconomical, the bore of the tubing is filled with a solid plastic nonmetallic material. This solid filler may be preformed or may be inserted under pressure or in a molten state. It is essential that this filler be composed of material which has a substantially lower melting point than that of the metallic tubular work-piece.

The solid filler is confined in the bore of the tube and, being practically noncompressible, acts as a mandrel, whereby wall reduction as well as diameter reduction is effected when the tube is passed through the die. Both before and after drawing, the total volume of tubular work-piece and its solid filler is the same and the reduction in cross sectional area is compensated by increase in length. The relationship between the cross sectional areas of the tubular work-piece and the solid filler cannot change unless the latter escapes; therefore, the cross sectional area of the wall must reduce in the same proportion as the solid filler.

When using the plastic filler of the present invention, it may be necessary to close both ends of the tubular work-piece in order to prevent the extrusion of the solid filler as the die acts to reduce their cross sectional areas. The tendency for the solid filler to extrude from the ends of the tube may be reduced by temperature control, as lower temperatures tend to retard the flow of plastic materials. The smaller the bore of the tube, the less tendency there is for the filler to flow from the ends thereof. This is because the frictional resistance between the solid filler and the tube is greater per unit of cross sectional area in a small bore as compared with a large bore.

Tubes with nonuniform walls, such as taper gage tubes that have heavy walls on one end, light gage on the other, or heavy on both ends and light in the middle, etc., may be produced by this method. The filler would be of sufficient plasticity to flow freely under pressure, and by regulating its escape from the inside of the work-piece as it passes through the die portions of the tube could be reduced in diameter without wall reduction or even with a wall thickening, while other portions would have the proportional wall reduction described above.

As the heat generated by the working of the metal and friction in the die will tend to raise the plasticity and increase the volume of the filler, it may be found necessary to remove this heat promptly by some means of cooling to prevent the filler from extruding from the tube after its passage through the die.

A number of passes through progressively smaller dies may be made until the desired tube diameter is obtained, or the metal of the tube has been hardened to such an extent by the work performed that it is necessary to anneal it before further work can be done. In either case the solid filler may be removed by heating the tube until the filler becomes liquid, then permitting it to drain out by gravity or forcing it out by compressed air, or gas.

According to a specific embodiment, there is prepared a mixture of 50 per cent paraffin wax and 50 per cent gilsonite (a natural asphalt) at room temperature. This mixture melts at 200 degrees Fahrenheit; therefore, it can be removed easily from the interior of the tubing by dipping the tube in boiling water. In addition, it does not leave a residue in the finished tube that might be objectionable. Experiments have shown that this mixture has about the same resistance to flow away from the die as paraffin at about −40 degrees Fahrenheit, but still tends to flow from the open end of the tube after drawing. While it is still necessary to remove the heat accrued from the drawing operation, it will not be necessary to close the end of the tube when using this mixture.

Experiments have shown that paraffin wax, when cooled to −40 degrees Fahrenheit, flowed only 3 inches away from the die, while at 86 degrees Fahrenheit (room temperature) it flowed 30 inches. Therefore, if the tube were not closed on the last end through the die, only 3 inches of that end would lack proper support to effect correct wall reduction if the temperature of −40 degrees Fahrenheit were maintained. If that end of the tube is closed or restricted, not only is this expensive, but any type of closure yet developed causes trouble in breaking the tube as it passes through the die. Experiments have shown that the heat generated by the work done in the die softens the outside of the paraffin core, with the result that it extrudes from the end of the tube after the drawing is completed, or in one case where the end was closed it blew off with great force some time after it left the die.

By increasing the proportions of gilsonite, which has a melting point of 392 degrees Fahrenheit, the core material can be made less viscous, but beyond a 75-25 per cent proportion (in relation to paraffin) it becomes friable and does not give uniform support to the inside of the tube as it passes through the die, also difficulty would be experienced in removing it and securing a clean surface on the inside of the finished tube.

In a recently conducted experiment, applicant applied a film of 50 per cent paraffin wax and 50 per cent gilsonite to the inside and outside of stainless steel tubing as a lubricant for a conventional cold-drawing over a stationary mandrel. It was surprisingly noted that a 30 per cent reduction was effected with very good results. The ordinary practice in drawing the same material was to coat the outside and inside surfaces with lead applied in a molten state, as heretofore no other lubricant would give satisfactory results.

The tubes to be filled with the plastic core can be immersed in a tank of heated paraffin-gilsonite mixture which will fill the interior and coat the exterior at the same time. As one end of the tubes will be closed by the usual pointing, when the tubes are withdrawn from the tank they can be held in a tilted position until the core hardens so it will not flow out by gravity.

While I have described one specific embodiment of my invention, it will be understood that I do not wish to be limited exactly thereto, since various modifications may be made without departing from the scope of my invention, as defined by the following claims.

I claim:

1. A method of cold-reducing metal tubing, characterized by the use of a mixture of solid wax and gilsonite inside the tubing during the reducing operation as an internal support for the tubing, said mixture comprising at least 25 per cent solid wax.

2. A method of cold-reducing metal tubing, characterized by the use of a mixture of solid wax and gilsonite inside the tubing during the reducing operation as an internal support for the tubing, and by the removal of heat from the tubing resulting from the cold-working, with sufficient promptness to maintain the viscosity of the wax to a degree permitting it to function as such support.

3. A method of cold-reducing metal tubing, characterized by the use of a highly viscous mixture of wax and gilsonite inside the tubing said mixture comprising at least 25 per cent solid wax, during the reducing operation as an internal support for the tubing, and by cooling the tubing to control the viscosity of this mixture.

4. A method of cold-reducing metal tubing, characterized by the use of an approximate 50-50 per cent mixture of solid wax and gilsonite inside the tubing during the reducing operation as an internal support for the tubing, said mixture comprising at least 25 per cent solid wax.

5. A method of cold-reducing metal tubing, characterized by the use of an approximate 50-50 per cent mixture of solid wax and gilsonite inside the tubing during the reducing operation as an internal support for the tubing, and by the removal from the tubing of heat resulting from the cold-working, with sufficient promptness to maintain the viscosity of the mixture to a degree permitting it to function as such support.

6. A method of cold-reducing metal tubing, characterized by the use of a highly viscous approximate 50-50 per cent mixture of solid wax and gilsonite inside the tubing during the reducing operation as an internal support for the tubing, and by cooling the tubing to control the viscosity of this mixture.

JOHN W. OFFUTT.

CERTIFICATE OF CORRECTION

Patent No. 2,241,518.                      May 13, 1941.

JOHN W. OFFUTT.

It is hereby certified that error appears in the printed specification of the above numbered patent requiring correction as follows: Page 2, second column, line 23, claim 2, after the word and comma "tubing," insert --said mixture comprising at least 25 per cent solid wax,--; lines 30 and 31, claim 3, strike out "said mixture comprising at least 25 per cent solid wax," and insert the same after the comma and before "and" in line 33, same claim; lines 39 and 40, claim 4, strike out the comma and words ", said mixture comprising at least 25 per cent solid wax"; and that the said Letters Patent should be read with this correction therein that the same may conform to the record of the case in the Patent Office.

Signed and sealed this 8th day of July, A. D. 1941.

(Seal)                                                Henry Van Arsdale,
                                                     Acting Commissioner of Patents.